US012645100B2

(12) United States Patent　(10) Patent No.:　US 12,645,100 B2

Kernick et al.　(45) Date of Patent:　Jun. 2, 2026

(54) METHODS FOR QUALITY CONTROL OF CONTACT LENSES

(71) Applicant: Johnson & Johnson Vision Care, Inc., Jacksonville, FL (US)

(72) Inventors: Edward R. Kernick, Jacksonville, FL (US); Peter Cerreta, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 825 days.

(21) Appl. No.: 17/835,385

(22) Filed: Jun. 8, 2022

(65) Prior Publication Data

US 2023/0400714 A1　Dec. 14, 2023

(51) Int. Cl.
*G02C 13/00*　(2006.01)
*G05B 19/418*　(2006.01)

(52) U.S. Cl.
CPC ..... *G02C 13/003* (2013.01); *G05B 19/41875* (2013.01); *G05B 2219/32368* (2013.01); *G05B 2219/33034* (2013.01)

(58) Field of Classification Search
CPC ........... G02C 13/003; G05B 19/41875; G05B 2219/32368; G05B 2219/33034;
(Continued)

(56) References Cited

U.S. PATENT DOCUMENTS

2004/0042003 A1* 3/2004 Dispenza ........... G01M 11/0278
356/239.1

2006/0251316 A1* 11/2006 Tucker ............... B29D 11/0098
382/141
(Continued)

FOREIGN PATENT DOCUMENTS

CN　　111062961 A　*　4/2020
EP　　3745298 A1　12/2020
(Continued)

OTHER PUBLICATIONS

Bhatt, et al., "Image-Based Surface Defect Detection Using Deep Leaning: A Review",, Journal of Computing M Information Science in Engineering,, Aug. 1, 2021, pp. 1-15, vol. 21 Issue 4.
(Continued)

*Primary Examiner* — Vincent H Tran
*Assistant Examiner* — Michael Tang
(74) *Attorney, Agent, or Firm* — Kristina Okafor

(57)　　　ABSTRACT

Disclosed herein are methods for quality control of contact lenses. An example method comprises receiving an input image indicative of a subject contact lens. The example method comprises outputting, based on analysis of the input image and using a first learning model, a first foreign matter metric and rejection data based on the analysis of the input image. The example method comprises outputting, using an artifact model and based on at least the rejection data, an artifact metric. The artifact model may be implemented based on one or more artifact attributes. The example method comprises outputting, using a second learning model and based at least on the first foreign matter metric and the artifact metric, a second foreign matter metric. The second learning model may be scale dependent. The second foreign matter metric is indicative of at least an accept or reject condition of the subject contact lens.

9 Claims, 2 Drawing Sheets

IMAGE INPUT

FIRST MODEL SCALE INDEPENDENT

ARTIFACT MODEL

SECOND MODEL SCALE DEPENDENT

RESULT OUTPUT

(58) Field of Classification Search
CPC ... G01N 2021/8883; G01N 2021/9583; G01N
21/958; G06T 2207/20081; G06T
2207/20084; G06T 7/0004; G06V
2201/06; B29D 11/00038; B29D
11/00961; B29D 11/0098; B65B 25/008;
B65B 57/00; G01M 11/0278; G01M
3/38; G06N 3/045; G06N 3/0464; G06N
3/048; G06N 3/082; G06N 3/09; G06N
20/20
USPC ......................................................... 700/109
See application file for complete search history.

(56) References Cited

U.S. PATENT DOCUMENTS

| | | | |
|---|---|---|---|
| 2008/0007694 A1* | 1/2008 | Wei ................. | B29D 11/00009 |
| | | | 351/159.75 |
| 2022/0090983 A1* | 3/2022 | Mellado .............. | G01N 21/958 |
| 2023/0033187 A1* | 2/2023 | Yoshida ................ | G06V 20/70 |

FOREIGN PATENT DOCUMENTS

| | | | |
|---|---|---|---|
| EP | 3848691 A2 | 7/2021 |
| WO | 2021225876 A1 | 11/2021 |

OTHER PUBLICATIONS

PCT Int'l Search Report dated Oct. 9, 2023 for PCT/IB2023/055942.

* cited by examiner

IMAGE INPUT

FIRST MODEL SCALE INDEPENDENT

ARTIFACT MODEL

SECOND MODEL SCALE DEPENDENT

RESULT OUTPUT

METHOD OVERVIEW

METHODS FOR QUALITY CONTROL OF CONTACT LENSES

BACKGROUND

Quality control for contact lenses may rely on inspection and detection techniques. However, improvements are needed.

SUMMARY

Disclosed herein are methods for quality control of contact lenses and/or contact lens packaging. An example method may comprise receiving an input image indicative of a subject contact lens. The example method may comprise analyzing the input image using a first learning model. The first learning model may be scale independent. The example method may comprise outputting a first foreign matter metric and rejection data based on the analyzing of the input image. The example method may comprise identifying, using an artifact model, false rejection data and true rejection data from the rejection data. The artifact model may be implemented based on one or more artifact attributes. The false rejection data may be indicative of the presence of one or more artifact attributes. The example method may comprise outputting, based on one or more of the false rejection data and the true rejection data, an artifact metric. The example method may comprise outputting, using a second learning model and based at least on the first foreign matter metric and the artifact metric, a second foreign matter metric. The second learning model may be scale dependent. The second foreign matter metric may be indicative of at least an accept or reject condition of the subject contact lens.

The first learning model may be trained and tested on a plurality of images comprising accept or reject conditions. The artifact model may be trained and tested at least on images comprising the one or more artifact attributes. The one or more artifact attributes may comprise clear bubbles, folded lens, or no artifact, or a combination thereof.

The second learning model may be trained and tested at least on a plurality of images comprising accept or reject conditions. The second learning model may be configured to recover false rejection based on scale of defect that caused the rejection. The second learning model may be configured to recover false rejection based on suspect artifacts that are less than a predetermined size.

Disclosed herein are methods for quality control of contact lenses. An example method may comprise receiving an input image indicative of a subject contact lens. The example method may comprise outputting, based on analysis of the input image and using a first learning model, a first foreign matter metric and rejection data based on the analysis of the input image. The example method may comprise outputting, using an artifact model and based on at least the rejection data, an artifact metric. The artifact model may be implemented based on one or more artifact attributes. The example method may comprise outputting, using a second learning model and based at least on the first foreign matter metric and the artifact metric, a second foreign matter metric. The second learning model may be scale dependent. The second foreign matter metric may be indicative of at least an accept or reject condition of the subject contact lens.

The first learning model may be trained and tested on a plurality of images comprising accept or reject conditions. The artifact model may be trained and tested at least on images comprising the one or more artifact attributes. The one or more artifact attributes may comprise clear bubbles, folded lens, or no artifact, or a combination thereof.

The second learning model may be trained and tested at least on a plurality of images comprising accept or reject conditions. The second learning model may be configured to recover false rejection based on scale of defect that caused the rejection. The second learning model may be configured to recover false rejection based on suspect artifacts that are less than a predetermined size.

BRIEF DESCRIPTION OF THE DRAWINGS

The following drawings show generally, by way of example, but not by way of limitation, various examples discussed in the present disclosure. In the drawings.

DETAILED DESCRIPTION

Disclosed herein are methods for quality control of contact lenses and/or contact lens packaging. Lens packages may require quality control to ensure that no foreign matter intrudes into the package. The packages may also require inspection to identify holes in the package or the lens, as well as edge defects in the lens. The foreign matter may damage the lens or contaminate the lens, both of which are detrimental to satisfying the customer's needs. The packages may be inspected at any stage of the process including before and after the packages are sealed.

In the following detailed description, reference is made to the accompanying drawings, which form a part hereof, and within which are shown by way of illustration specific embodiments by which the invention may be practiced. It is to be understood that other embodiments may be utilized, and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
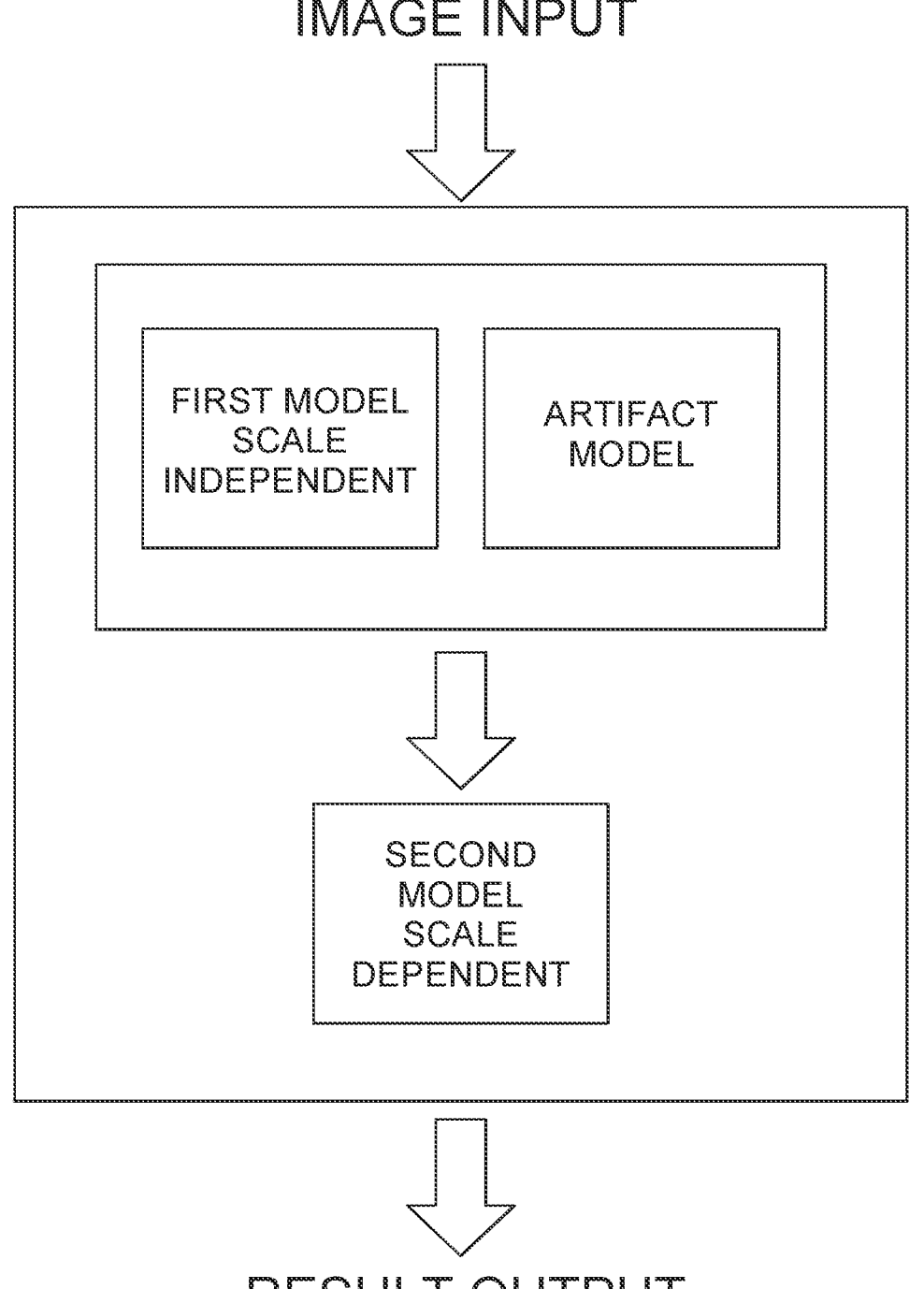
FIG. 1 depicts an exemplary series model diagram.

Series Model—a series model may comprise an ensemble model in series with a traditional deep learning model to assist in reducing false rejects and maintaining high detection capability. As an illustrative example, a series model may be used. Firstly, the ensemble model may comprise a highly capable deep learning model coupled with an artifact model. The artifact model may be used to recover false rejects due to folded lenses and bubbles. The second deep learning model, in series with the ensemble model, may be used to recover false rejects due to suspect artifacts less than a predetermined size. The first deep learning model may be scale independent, whereas the second deep learning model is scale dependent. The ordering of these models in the series, scale independent then scale dependent, allows for high capability with the first model (catches suspect artifacts regardless of size) and then mitigation of false rejects (due to size) by the second model. If the order of the models was reversed, the pool of total detected true rejects would be smaller due to scale dependency, resulting in lower overall series model capability. FIG. 1 shows the ordering of the ML models which form an example series model in accordance with an aspect of the present disclosure.

Figure 2:
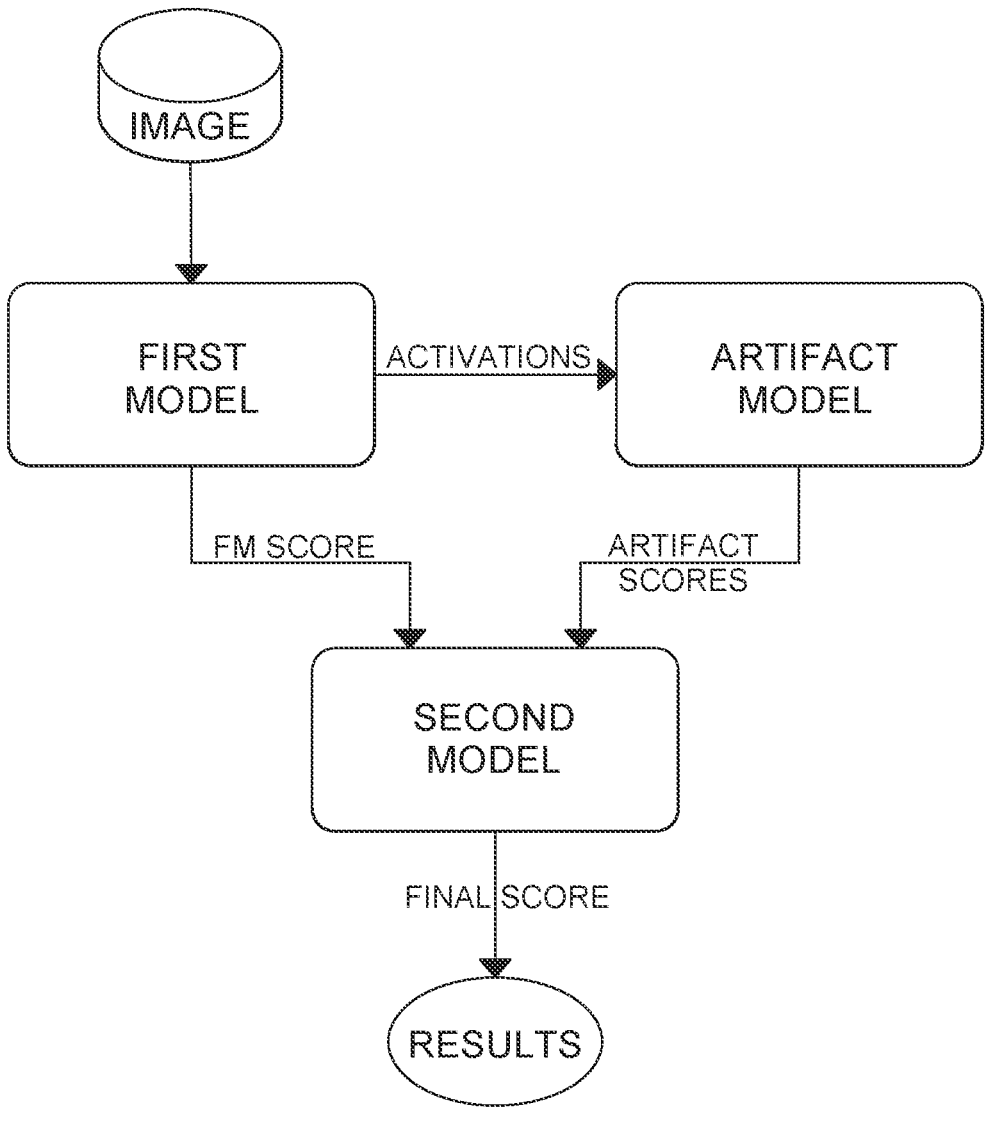
FIG. 2 depicts an exemplary ensemble diagram.

Ensemble Model—an ensemble model combines the standard deep learning model in concert with an artifact model (support vector machine). These models may be running in parallel and put into an ensemble model to produce an optimum model that has high detection capability and low false rejects (see FIG. 2).

As an illustrative example, the ensemble was trained with 3018 images (see table 1 for details).

TABLE 1

| Ensemble Training Images | |
| --- | --- |
| Ground Truth Label | Image Quantity |
| Good Images | 2320 |
| Bad Images | 698 |

The purpose of the artifact model is twofold in this case. First, it recovers false rejects from deep learning model 1. Second, it reinforces true rejects from deep learning model 1. The artifact model was trained with 833 images covering three primary attributes as described below in table 2. Other artifact attributes may be used.

TABLE 2

| Artifact Model Training Images | | |
| --- | --- | --- |
| Attribute | Quantity Of Images | Assigned Label |
| Clear Bubbles | 89 | Good |
| Folded | 144 | Good |
| No Artifact | 500 | NA |

Disclosed herein are methods for quality control of contact lenses. The methods may be performed by a computing device. Instructions for performing method steps may be stored in memory of the computing device. The method steps may be executed by a processor of the computing device.

An input image indicative of a subject contact lens may be received.

The input image may be analyzed using a first learning model. The first learning model may be scale independent. The first learning model may comprise a deep learning model. The first learning model may be trained and tested on a plurality of images comprising accept or reject conditions.

A first foreign matter metric and rejection data may be outputted based on the analyzing of the input image.

False rejection data and true rejection data may be identified using an artifact model from the rejection data. The artifact model may be implemented based on one or more artifact attributes. The false rejection data may be indicative of the presence of the one or more artifact attributes. The artifact model may be trained and tested at least on images comprising the one or more artifact attributes. The one or more artifact attributes may comprise clear bubbles, folded lens, or no artifact, or a combination thereof.

An artifact metric may be outputted based on one or more of the false rejection data and the true rejection data.

A second foreign matter metric may be outputted using a second learning model and based at least on the first foreign matter metric and the artifact metric. The second learning model may be scale dependent. The second foreign matter metric may be indicative of at least an accept or reject condition of the subject contact lens. The second learning model may comprise a deep learning model. The second learning model may be trained and tested at least on a plurality of images comprising accept or reject conditions. The second learning model may be configured to recover false rejection based on scale of defect that caused the rejection. The second learning model may be configured to recover false rejection based on suspect artifacts that are less than a predetermined size.

Disclosed herein are methods for quality control of contact lenses. The methods may be performed by a computing device. Instructions for performing method steps may be stored in memory of the computing device. The method steps may be executed by a processor of the computing device.

An input image indicative of a subject contact lens may be received.

Based on analysis of the input image and using a first learning model, a first foreign matter metric and rejection data may be outputted based on the analysis of the input image. The first learning model may comprise a deep learning model. The first learning model may be trained and tested on a plurality of images comprising accept or reject conditions.

An artifact metric may be outputted using an artifact model and based on at least the rejection data. The artifact model may be implemented based on one or more artifact attributes. The artifact model may be trained and tested at least on images comprising the one or more artifact attributes. The one or more artifact attributes may comprise clear bubbles, folded lens, or no artifact, or a combination thereof.

A second foreign matter metric may be outputted using a second learning model and based at least on the first foreign matter metric and the artifact metric. The second learning model may be scale dependent. The second foreign matter metric may be indicative of at least an accept or reject condition of the subject contact lens. The second learning model may comprise a deep learning model. The second learning model may be trained and tested at least on a plurality of images comprising accept or reject conditions. The second learning model may be configured to recover false rejection based on scale of defect that caused the rejection. The second learning model may be configured to recover false rejection based on suspect artifacts that are less than a predetermined size. Any desired size threshold may be used such as less than 1000 microns, less than 900 microns, less than 800 microns, less than 700 microns, less than 600 microns, less than 500 microns, less than 400 microns, 300 microns, less than 200 microns, or less than 100 microns, in length.

Aspects

The present disclosure comprises at least the following aspects.

Aspects 1: A method for quality control of contact lenses, the method comprising: receiving an input image indicative of a subject contact lens; analyzing the input image using a first learning model, wherein the first learning model is scale independent; outputting a first foreign matter metric and rejection data based on the analyzing of the input image; identifying, using an artifact model, false rejection data and true rejection data from the rejection data, wherein the artifact model is implemented based on one or more artifact attributes, and wherein the false rejection data is indicative of the presence of the one or more artifact attributes; outputting, based on one or more of the false rejection data and the false rejection data, an artifact metric; and outputting, using a second learning model and based at least on the first foreign matter metric and the artifact metric, a second foreign matter metric, wherein the second learning model is scale dependent, and wherein the second foreign matter metric is indicative of at least an accept or reject condition of the subject contact lens.

Aspect 2: The method of aspect 1, wherein the first learning model comprises a deep learning model.

Aspect 3: The method of any of aspects 1-2, wherein the first learning model is trained and tested on a plurality of images comprising accept or reject conditions.

Aspect 4: The method of any of aspects 1-3, wherein the artifact model is trained and tested at least on images comprising the one or more artifact attributes.

Aspect 5: The method of any of aspects 1-4, wherein the one or more artifact attributes comprise clear bubbles, folded lens, or no artifact, or a combination thereof.

Aspect 6: The method of any of aspects 1-5, wherein the second learning model comprises a deep learning model.

Aspect 7: The method of any of aspects 1-6, wherein the second learning model is trained and tested at least on a plurality of images comprising accept or reject conditions.

Aspect 8: The method of any of aspects 1-7, wherein the second learning model is configured to recover false rejection based on scale of defect that caused the rejection.

Aspect 9: The method of any of aspects 1-8, wherein the second learning model is configured to recover false rejection based on suspect artifacts that are less than a predetermined size.

Aspect 10: A method for quality control of contact lenses, the method comprising: receiving an input image indicative of a subject contact lens; outputting, based on analysis of the input image and using a first learning model, a first foreign matter metric and rejection data based on the analysis of the input image; outputting, using an artifact model and based on at least the rejection data, an artifact metric, wherein the artifact model is implemented based on one or more artifact attributes; and outputting, using a second learning model and based at least on the first foreign matter metric and the artifact metric, a second foreign matter metric, wherein the second learning model is scale dependent, and wherein the second foreign matter metric is indicative of at least an accept or reject condition of the subject contact lens.

Aspect 11: The method of aspect 10, wherein the first learning model comprises a deep learning model.

Aspect 12: The method of any of aspects 10-11, wherein the first learning model is trained and tested on a plurality of images comprising accept or reject conditions.

Aspect 13: The method of any of aspects 10-12, wherein the artifact model is trained and tested at least on images comprising the one or more artifact attributes.

Aspect 14: The method of any of aspects 10-13, wherein the one or more artifact attributes comprise clear bubbles, folded lens, or no artifact, or a combination thereof.

Aspect 15: The method of any of aspects 10-14, wherein the second learning model comprises a deep learning model.

Aspect 16: The method of any of aspects 10-15, wherein the second learning model is trained and tested at least on a plurality of images comprising accept or reject conditions.

Aspect 17: The method of any of aspects 10-16, wherein the second learning model is configured to recover false rejection based on scale of defect that caused the rejection.

Aspect 18: The method of any of aspects 10-17, wherein the second learning model is configured to recover false rejection based on suspect artifacts that are less than a predetermined size.

Aspect 19: The method of any of aspects 1-18, wherein the second learning model is configured to recover false rejection based on suspect artifacts that are less than 1000 microns, less than 900 microns, less than 800 microns, less than 700 microns, less than 600 microns, less than 500 microns, less than 400 microns, 300 microns, less than 200 microns, or less than 100 microns, in length.

In the system or method, once the image has been acquired, pre-processing of the images may take place prior to analyzing the image with the model. Pre-processing of the image may comprise identifying the specific region of interest, enhancing contrast, adding or subtracting other images taken, and the like.

A convolutional neural network (CNN) may be designed or modified and implemented for identification of packages to be rejected. Packages may be sealed or unsealed and may contain a lens or may be empty. The packages may contain liquid or no liquid in addition to containing a lens or no lens. Multiple platforms exist for the creation of CNNs and will be understood by those of skill in the art, including Tensorflow (Google), Caffe (UC Berkeley), CNTK (Microsoft), Theano (LISA lab), Keras (Google), Matlab (Mathworks), Octave & Phython. An existing module may be modified to slice original images to smaller sizes with only the regions of interest (ROIs) appropriately sized to feed into the CNN. These images were then defined by a region of interest (ROI) of, for instance 299 by 299 pixels (monochrome) defined by the packages themselves so that each ROI fed into the CNN has the appropriate number of pixels for processing. An exemplary CNN such as Inception V3 may comprise 48 total layers with a mixture of convolutional layers, max pooling layers and fully connected layers. In the later stages of the network a ReLU (rectifying linear unit) may be used as well as dropping a significant number of nodes in a randomized manner in order to avoid over-fitting. A filter of size of, for instance, 3×3 may be used with a stride of 1, 2, or larger numbers. Layers may use a pad around the edge and corners of the image to enhance processing of the image. Similarly, the various layers of the network (e.g. convolutional layers, max pooling layers, softmax, dropout, fully connected layers, and the like) may be varied to achieve better results of identifying those packages with some defect while not mis-identifying those packages without a defect as defective or containing FM.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be or comprise a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method for inspecting contact lenses, the method comprising:

receiving an input image indicative of a subject contact lens, optionally wherein the input image was acquired while the contact lens was in a contact lens package;

analyzing the input image using (i) an ensemble model comprising a first learning model that is scale independent running in parallel with an artifact model, and (ii) a second learning model that is scale dependent running in series with the ensemble model;

wherein the first learning model has been trained on a plurality of images comprising accept or reject conditions for the contact lenses:

wherein the artifact model has been trained on a plurality of images comprising one or more artifact attributes for the contact lenses, the artifact attributes representing false reject conditions and comprising clear bubbles, folded lens, no artifact, or combinations thereof;

wherein the artifact model is configured to identify false rejects from the first learning model based on the artifact attributes;

wherein the second learning model is configured to identify false rejects from the first learning model and the artifact model based on artifacts being less than a predetermined size;

outputting using the first learning model, a first foreign matter metric and first rejection data based on the analyzing of the input image, wherein the first foreign matter metric suggests one or more of the presence of foreign matter, a hole or edge defect in the contact lens, a hole in the contact lens package, or any combination thereof;

differentiating using the artifact model, false rejection data from true rejection data in the first rejection data, wherein the false rejection data is indicative of the presence of the one or more artifact attributes;

outputting using the artifact model, based on one or more of the false rejection data and the true rejection data, an artifact metric;

outputting, using the second learning model and based at least on the first foreign matter metric and the artifact metric, a second foreign matter metric, wherein the second foreign matter metric is indicative of a final accept or reject condition of the subject contact lens; and rejecting or accepting the contact lenses based at least on the second foreign matter metric.

2. The method of claim 1, wherein the first learning model comprises a deep learning model.

3. The method of claim 1, wherein the predetermined size is less than 1000 microns.

4. The method of claim 1, wherein the second learning model comprises a deep learning model.

5. The method of claim 1, wherein prior to analyzing the input image with the first learning model, the image is pre-processed, wherein pre-processing comprises one or more of identifying a specific region of interest, enhancing contrast, slicing the original image to a smaller size with only the region of interest sized to be input into the first learning model, or any combination thereof.

6. The method of claim 1, wherein multiple images are acquired for input to the first learning model and, prior to analyzing any of the input images with the first learning model, one or more images are added to the multiple images and/or one or more images are subtracted from the multiple images.

7. The method of claim 1, wherein the input image was taken while the contact lens was in a sealed contact lens package containing liquid.

8. The method of claim 1, wherein the input image was taken while the contact lens was in an unsealed contact lens package.

9. The method of claim 1, wherein the input image was taken while the contact lens was in a contact lens package and the first foreign matter metric indicates the presence of foreign matter in the package.

* * * * *